US012694269B2

(12) United States Patent　　　　(10) Patent No.:　US 12,694,269 B2
Goodsitt et al.　　　　　　　　　　(45) Date of Patent:　　　Jul. 28, 2026

---

(54) SELECTIVE REPORTING OF MACHINE LEARNING PARAMETERS FOR FEDERATED LEARNING

(71) Applicant: Capital One Services, LLC, McLean, VA (US)

(72) Inventors: Jeremy Goodsitt, Champaign, IL (US); Kenny Bean, McLean, VA (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 980 days.

(21) Appl. No.: 17/814,475

(22) Filed: Jul. 22, 2022

(65) Prior Publication Data

US 2024/0028870 A1　Jan. 25, 2024

(51) Int. Cl.
*G06N 3/045*　　　(2023.01)
*G06N 3/048*　　　(2023.01)

(52) U.S. Cl.
CPC ............. *G06N 3/045* (2023.01); *G06N 3/048* (2023.01)

(58) Field of Classification Search
CPC ........ G06N 3/045; G06N 3/048; G06N 3/098; G06N 3/0442; G06N 3/0455; G06N 3/0464; G06N 3/084; G06N 5/01; G06N 7/01; G06N 20/20
See application file for complete search history.

(56) References Cited

U.S. PATENT DOCUMENTS

| | | | |
|---|---|---|---|
| 2020/0272899 A1* | 8/2020 | Dunne | G06N 3/098 |
| 2020/0293887 A1* | 9/2020 | De Brouwer | G06N 3/09 |
| 2021/0374608 A1* | 12/2021 | El-Khamy | G06N 20/20 |
| 2022/0351039 A1* | 11/2022 | Satheesh Kumar | G06N 3/08 |
| 2023/0016827 A1* | 1/2023 | Wu | G06N 3/045 |
| 2023/0214642 A1* | 7/2023 | Sidahmed | G06N 3/084 |
| | | | 706/25 |
| 2024/0054354 A1* | 2/2024 | Zhang | G06N 3/09 |

OTHER PUBLICATIONS

Wen, D. et al., "Federated Dropout—A Simple Approach for Enabling Federated Learning on Resource Constrained Devices", https:/arxiv.org/abs/2109.15258, Feb. 5, 2022 (Year: 2022).*

Horvath, S. et al., "Fjord: Fair and Accurate Federated Learning under heterogeneous targets with Ordered Dropout", https://arxiv.org/abs/2102.13451, Jan. 11, 2022 (Year: 2022).*

* cited by examiner

*Primary Examiner* — Alexey Shmatov
*Assistant Examiner* — Devika S Maharaj
(74) *Attorney, Agent, or Firm* — Foley & Lardner LLP

(57) ABSTRACT

A method includes sending a data selection parameter to a client computing device, wherein the client computing device stores a distributed instance of a machine learning model, and the machine learning model includes at least a first subset of parameters and a second subset of parameters. In response to a determination that a transmission criterion is satisfied, the client computing device is caused to report the first subset of parameters based on the data selection parameter. The method further comprises obtaining the parameters of the first subset of parameters of the distributed instance from the client computing device and updating the federated learning model based on the first subset of parameters of the distributed instance from the client computing device.

19 Claims, 4 Drawing Sheets

300

400

SELECTIVE REPORTING OF MACHINE LEARNING PARAMETERS FOR FEDERATED LEARNING

BACKGROUND

Machine learning provides significant opportunities in various areas, such as fraud detection, privacy protection, and operation optimization. A system may perform various types of machine learning operations to help recognize words, predict user actions, recommend future actions, etc. These machine learning operations may vary in complexity, computational requirements, or applicability with respect to different types of objectives. In many cases, a machine learning operation may take advantage of communications in a network of different computing systems, where each computing system may have access to its own sources of data that are independent of other computing systems. These computing systems may cooperate in a federated manner to perform one or more learning operations.

SUMMARY

Federated learning provides significant opportunities that may enhance the accuracy and speed of machine learning operations to improve a machine learning model. By taking advantage of the processing power of multiple devices, federated learning processes may generate models trained on large datasets at a rate that may significantly outpace other types of learning processes. Furthermore, federated learning permits learning that is based on private data that may be otherwise inaccessible to an enterprise-wide system. However, federated learning relies on communication between the devices performing learning operations and the device used to aggregate the results of those learning operations. This reliance can make participants in federated learning processes vulnerable to third parties that may intercept this communication. Without appropriate safeguards, federated learning may enable third parties to reverse-engineer user data, generate unauthorized copies of data models, or perform other malicious activities. Furthermore, various communication systems may be unreliable or hindered by bandwidth limitations, reducing the amount of data they may transfer between devices.

Some embodiments may perform operations to send a data selection parameter to a client computing device, where the client computing device may perform one or more learning operations based on data available to the client computing device. The results of the learning operations may be combined by a model data aggregator to update a federated learning model. The client computing device may use the data selection parameter to determine what results of a training operation to send back to the model data aggregator. For example, a server may send a data selection parameter representing a first layer of a neural network to a client computing device. The client computing device may store a client-side version of the neural network and perform a set of learning operations based on the client-side version of the neural network. After completing a set of learning operations, the client computing device may determine a time at which a set of transmission criteria is satisfied. Once the set of transmission criteria is satisfied, the client computing device may select a subset of the neural network layers indicated by the data selection parameters to send to the server or other data aggregator. After receiving the machine learning results, the server or other data aggregator may update the portions of a federated learning model that correspond with the neural network weights or other values of the client-side learning model based on the learning results sent from the client computing device. By selectively sending only certain portions of a trained learning model, some embodiments may reduce the amount of bandwidth being consumed by federated learning training operations. Furthermore, by sending only data corresponding with portions of a learning model instead of the entire learning model, some implementations may increase the difficulty of deciphering a user's private information from the data being transferred by a client computing device to a server.

Various other aspects, features, and advantages will be apparent through the detailed description of this disclosure and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise. Furthermore, a "set" may refer to a singular form or a plural form, such that a "set of items" may refer to one item or a plurality of items.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
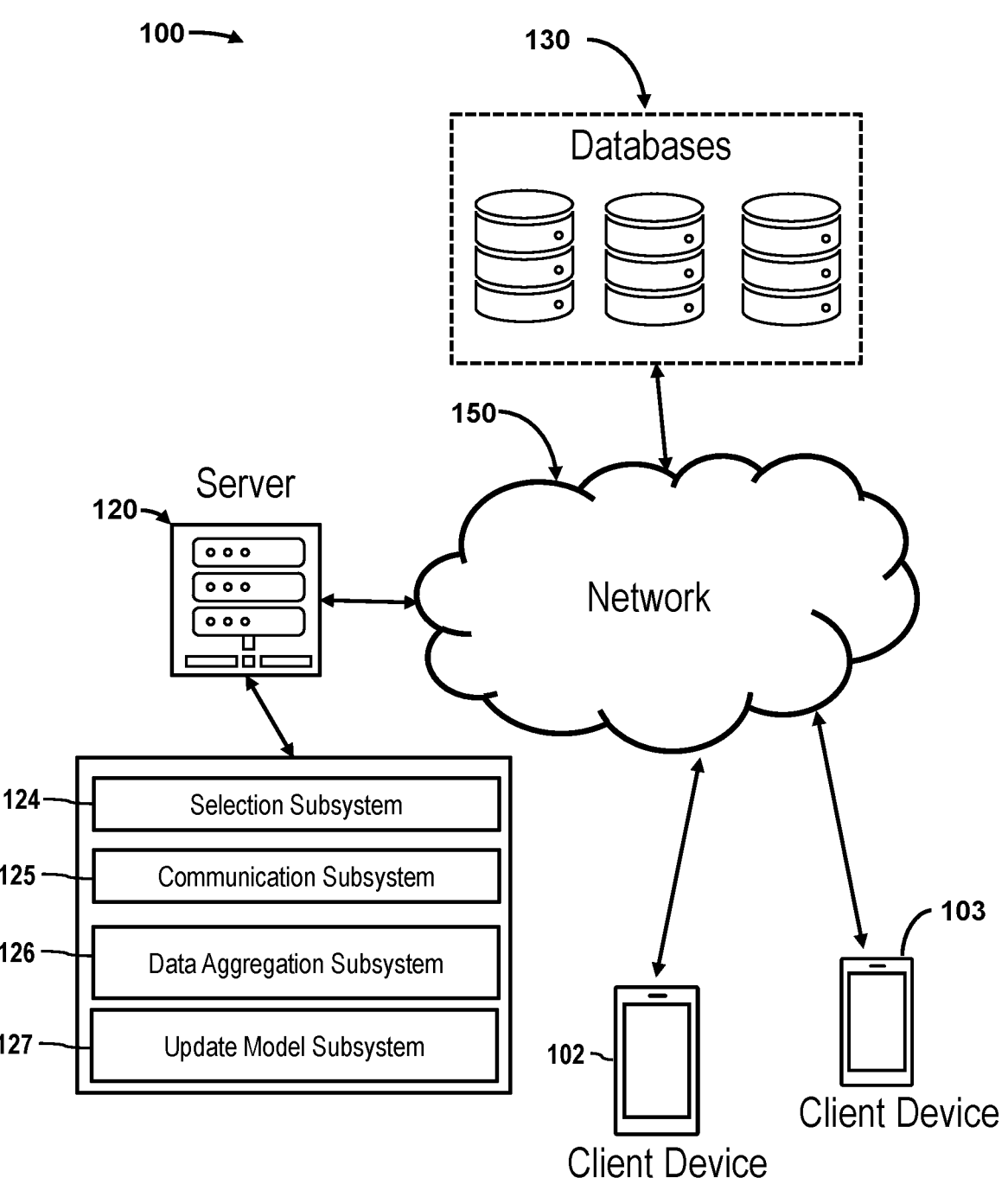
FIG. 1 shows an illustrative system for updating a federated learning model, in accordance with one or more embodiments.

FIG. 1 shows an illustrative system for updating a federated learning model, in accordance with one or more embodiments. A system 100 includes a first client computing device 102 and a second client computing device 103. While shown as mobile computing devices, the client computing devices 102-103 may include other types of computing devices such as a desktop computer, a wearable headset, a smartwatch, another type of mobile computing device, etc. In some embodiments, the client computing devices 102-103 may communicate with various other computing devices via a network 150, where the network 150 may include the Internet, a local area network, a peer-to-peer network, etc.

The first client computing device 102, the second client computing device 103, or other computing devices may send and receive messages through the network 150 to communicate with a server 120, where the server 120 may include a non-transitory storage medium storing program instructions to perform one or more operations of subsystems 124-127 Further, while one or more operations are described herein as being performed by particular components of the system 100, those operations may be performed by other components of the system 100 in some embodiments. One or more operations described in this disclosure as being performed by the server 120 may instead be performed by the first client computing device 102, the second client computing device 103, etc. For example, the first client computing device 102 may collect data from other user devices to combine the data for the purpose of updating a distributed instance of the machine learning model stored on the first client computing device 102.

In some embodiments, a memory of the first client computing device 102, of the second client computing device 103, or of another computing device may be used to store program instructions for applications, machine learning models, received learning model parameters or other learning results from client computing devices, test data, or other data described in this disclosure. In addition, although some embodiments are described herein with respect to neural network models, other prediction models may be used instead of or in addition to the neural network models. For example, a probabilistic model may be used to replace a neural network model in one or more embodiments to determine whether an input satisfies an objective or not. For example, the server 120 may send, to a client computing device, a data selection parameter identifying a specific subset of trees of a random forest model. The client computing device may then perform a set of learning operations that causes the client computing device to update model parameters of the specific subset of trees and send the updated model parameters back to the server.

In some embodiments, the set of computer systems and subsystems illustrated in FIG. 1 may include one or more computing devices having electronic storage or being otherwise capable of accessing electronic storage, where the electronic storage may include a set of databases 130. The set of databases 130 may include various values used to perform operations described in this disclosure, such as test data, aggregated machine learning model parameters, individual machine learning model parameters received from different computing devices, hyperparameters for machine learning models, other values used in this disclosure, etc.

Subsystems 124-127

In some embodiments, a selection subsystem 124 may obtain training data, testing data, or other data from a data source, such as the set of databases 130. The selection subsystem 124 may determine that an update condition has been met based on one or more criteria. For example, some embodiments may determine that an accuracy threshold is no longer being satisfied by an output of a machine learning model and, in response, send a message to a client computing device to trigger a federated learning operation. Alternatively, some embodiments may determine that a user has directly triggered a learning operation to update biases, weights, or other values of a machine learning model.

In some embodiments, a communication subsystem 125 may send a machine learning model to the first client computing device 102, the second client computing device 103, or other client computing devices. The communication subsystem 125 may retrieve the learning model from the set of databases 130 or another memory accessible to the server 120. For example, the server 120 may access a set of neural network weights for a plurality of layers of a neural network and send the set of neural network weights to one or client computing devices, such as the first client computing device 102.

In some embodiments, a machine learning model may include sending values representing the weights, biases, activation function parameter values, hyperparameters, or other values characterizing a set of elements of the machine learning model. For example, the communication subsystem 125 may send a machine learning model to the first client computing device 102 or the second client computing device 103 by sending each of the neural network weights and filter values of a convolutional neural network to the first client computing device 102 or the second client computing device 103. While some embodiments may describe sending a neural network as a machine learning model to be sent to client computing devices, some embodiments may send other machine learning models, such as a random forest model, a naïve Bayes model, etc.

In some embodiments, the communication subsystem 125 may send a data selection parameter to the first client computing device 102. As described elsewhere in this disclosure, the first client computing device 102 may use the data selection parameter to determine what subset of data of a machine learning model to send back to the server 120. In some implementations, a data selection parameter identifying a set of layers of a neural network model to be sent from the client computing devices may be preestablished. For example, the server 120 may send a data selection parameter to the first client computing device 102, where the data selection parameter value may identify a second layer of a multilayer neural network. The first client computing device 102 may then perform a training operation to update a neural network and selectively determine which layer of the multilayer neural network to report based on the data selection parameter. For example, the first client computing device 102 may select a second layer of the multilayer neural network for transmission to the server 120 based on the data selection parameter. Alternatively, the set of layers to be sent may be randomly or pseudo-randomly selected, where a random operation may be based on a physically measured phenomenon and a pseudorandom operation may be based on a pseudorandom algorithm. For example, the server 120 may pseudo-randomly select a data selection parameter identifying a first layer of a neural network model and send the pseudo-randomly selected data selection parameter to the first client computing device 102. After training a distributed instance of the neural network based on user inputs (e.g., user data entry, user selections, etc.), the first client computing device 102 may send a parameter of the first layer based on the data selection parameter.

Once the first client computing device 102 has received a machine learning model from the communication subsystem 125, the client computing device may store a client-side version of the set of neural network weights or other values of a transmitted machine learning model. In some embodiments, the first client computing device 102 includes an existing distributed instance of the machine learning model. The first client computing device 102 may modify its existing set of neural network weights or other model parameters based on the received values from the communication subsystem 125. Alternatively, if the first client computing device 102 does not include an existing machine learning model corresponding with the model weights, the client computing device may implement a machine learning model based on the values received from the communication subsystem 125. For example, the communication subsystem 125 may transmit a set of values representing a transformer neural network model to the first client computing device 102, where the first client computing device 102 does not include an implementation of the transformer neural network. In response, the first client computing device 102 may modify its records and update a set of values to permit an application to implement a distributed instance of the transformer neural network model to predict a set of values using the newly implemented transformer neural network.

In some embodiments, the first client computing device 102 may be provided with one or more transmission criteria or values for one or more transmission criteria. In some embodiments, the first client computing device 102 may determine that a set of transmission criteria is satisfied. A determination that the set of transmission criteria is satisfied may cause the first client computing device 102 to send trained model parameters of a distributed instance of the machine learning model to the server 120. Alternatively, the first client computing device 102 may have a set of transmission criteria preestablished on an application. The set of transmission criteria may include determining that a training metric has satisfied a training metric threshold. For example, the first client computing device 102 may receive a neural network model from the server 120, where an application may use the neural network model to predict whether a user will select a specified category or not select the specified category in a target user interface (UI) displayed on the first client computing device 102. The first client computing device 102 may record each time a user has accessed the target UI and whether or not the user had selected the specified category of the target UI in a set of test history records. In some embodiments, the first client computing device 102 may update a distributed instance of the neural network model by using the set of test history records. For example, the first client computing device 102 may update the distributed instance after each update to the set of testing records, after a predetermined number of updates to the set of testing records, after a threshold number of updates to the set of testing records, etc. As described elsewhere in this disclosure, some implementations may keep track of the number of updates to the set of testing records as a local training metric.

In some implementations, the first client computing device 102 may update its distributed instance of a neural network model by performing a training operation based on the inputs received into the first client computing device 102 or otherwise based on data stored or otherwise accessible to the first client computing device 102. While conventional systems may cause the first client computing device 102 to send all of the weights to the server 120 after a local training operation, some implementations described in this disclosure may cause the first client computing device 102 to instead send a subset of the weights to the server 120 without sending other weights of the neural network to the server 120 after the local training operation. For example, the first client computing device 102 may update a distributed instance of a neural network such that a set of neural network layers of the neural network (e.g., the first and second layers of the neural network) are updated. However, the client computing device may send only the first layer of the neural network to the server 120 without sending the second layer of the neural network to the server 120.

As described elsewhere in this disclosure, the first client computing device 102 may be provided with a data selection parameter that causes the first client computing device 102 to send the neural network layer corresponding with the data selection parameter. Furthermore, as described elsewhere in this disclosure, the client computing device may be sent a set of values or program instructions representing a restructuring order. In some implementations, the first client computing device 102 may modify the order of parameters that it sends based on the restructuring order to obfuscate the parameters, thus preventing unauthorized use.

In some implementations, the first client computing device 102 may provide additional values that may be used to determine an additional weight to assign to the values sent from the first client computing device 102. For example, the first client computing device 102 may train a distributed instance of a machine learning model with 153 values entered by a user. After determining that a set of transmission criteria has been satisfied, the first client computing device 102 may send the parameters of the distributed instance of the machine learning model to the server 120. The first client computing device 102 may then send the value "153" with the model parameters or otherwise send the value "153" in association with the model parameters, where the value "153" may represent a local training metric. The local training metric may then be used to determine a training weight for the data sent by the first client computing device 102, where the training weight may increase the impact of the data sent from the first client computing device 102 to data sent from other client computing devices with respect to the effect on a combined value used to update a federated machine learning model stored on a server, distributed computing system, or other set of computing devices.

In some embodiments, a data aggregation subsystem 126 may collect machine learning model parameters from the first client computing device 102 or other devices connected to the network 150. The data aggregation subsystem 126 may obtain parameters, such as neural network weights, hyperparameters, or other values characterizing a version of a neural network model. The first client computing device 102 may provide a subset of the layers of a neural network model to the first client computing device 102, where the transmitted subset may be less than the total number of layers of a neural network model. The data aggregation subsystem 126 may obtain multiple subsets of layers for the same layer levels of a neural network model from a plurality of client computing devices. For example, the data aggregation subsystem 126 may obtain neural network weights of a first layer of a distributed instance of a neural network model trained by the first client computing device 102 and neural network weights of the first layer of a distributed instance of the neural network model trained by the second client computing device 103. The data aggregation subsystem 126 may then combine the weights for the first layer to form a combined parameter value for a server version of the neural network model based on the weights from the first client computing device 102 and the second client computing device 103.

The data aggregation subsystem 126 may determine combined values for different layers of a neural network model using one or more measures of central tendency. For example, the data aggregation subsystem 126 may determine combined parameter values for each respective neural unit of a first layer of a neural network model by determining a mean average of the parameter values of each of the respective neural units. Alternatively, or in addition, the data aggregation subsystem 126 may aggregate values in other ways, such as by determining a median, a mode, or another measure of central tendency, etc. Furthermore, some embodiments may determine a weighted average, where the neural network weights may themselves be weighed by a training metric sent in association with the neural network weights. For example, if the first client computing device 102 sends a neural network parameter for a target neural unit equal to 0.8 and a training weight equal to 0.4, and the second client computing device 103 sends a neural network parameter for a target neural unit equal to 0.3 and a training weight equal to 0.6, some embodiments may calculate that the contribution for the target neural unit was equal to 0.36 with respect to the first client computing device and calculate that the contribution for the target neural unit was equal to 0.18 for the target neural unit with respect to the second client computing device. Some embodiments may then sum the two contributions such that the combined value for the target neural unit is equal to 0.54.

While the data aggregation subsystem 126 is described as obtaining different layers of neural network weights, a data aggregation subsystem may obtain other subsets of neural network parameters, such as parameters of neural units across different neural network layers. Alternatively, or in addition, the data aggregation subsystem may combine parameters for other types of learning models, such as weights of a random forest, parameters of a naïve Bayes model, etc. The data aggregation subsystem 126 may perform data preprocessing operations described elsewhere in this disclosure before aggregating collected data. For example, the data aggregation subsystem 126 may remove noise, decrypt encrypted information, apply one or more filters to incoming data, etc.

The data aggregation subsystem 126 may combine different parameter values based on the layers of a neural network. For example, the data aggregation subsystem 126 may obtain the weights of a first layer of a first version of a neural network from the first client computing device 102. The data aggregation subsystem 126 may also obtain the weights of the first layers of other versions of the neural network model sent from other client computing devices. The data aggregation subsystem 126 may then update a federated learning model based on the obtained weights of the various versions of the first layer of the neural network model. For example, the data aggregation subsystem 126 may obtain a plurality of versions of a first layer of a convolutional neural network model and determine a set of mean averages for each of five different neural units of the first layer based on the versions of the weights for the five different neural units provided by a plurality of client computing devices. In some implementations, each of these mean average values may represent a change to the weight of their respective neural unit. For example, as described elsewhere in this disclosure, if the mean average of a first neural unit is 0.5, the weight of a neural unit of a federated machine learning model may be increased by 0.5.

A model update subsystem 127 may update a federated machine learning model based on data provided by a set of client computing devices that includes the first client computing device 102 and the second client computing device 103. For example, after aggregating and combining the data from a plurality of client computing devices that includes the first client computing device 102 and the second client computing device 103, some embodiments may update the corresponding elements of a federated learning model based on the combined data. In some implementations, the combined data may represent a new weight, bias, or another neural network parameter. Some implementations may then replace an existing parameter value with the new combined parameter value. Alternatively, the combined parameter value may represent a change to an existing value, such as a change to an existing neural network weight. In response to receiving the change to the existing neural network weight, some embodiments may update the existing neural network weight with the change indicated by the combined parameter value. For example, some embodiments may add a combined value to an existing value of a neural unit. While some embodiments may determine a change as a sum to a stored value of a learning model parameter, other embodiments may determine a change as a multiplication factor, a ratio, an exponential value, etc.

Figure 2:
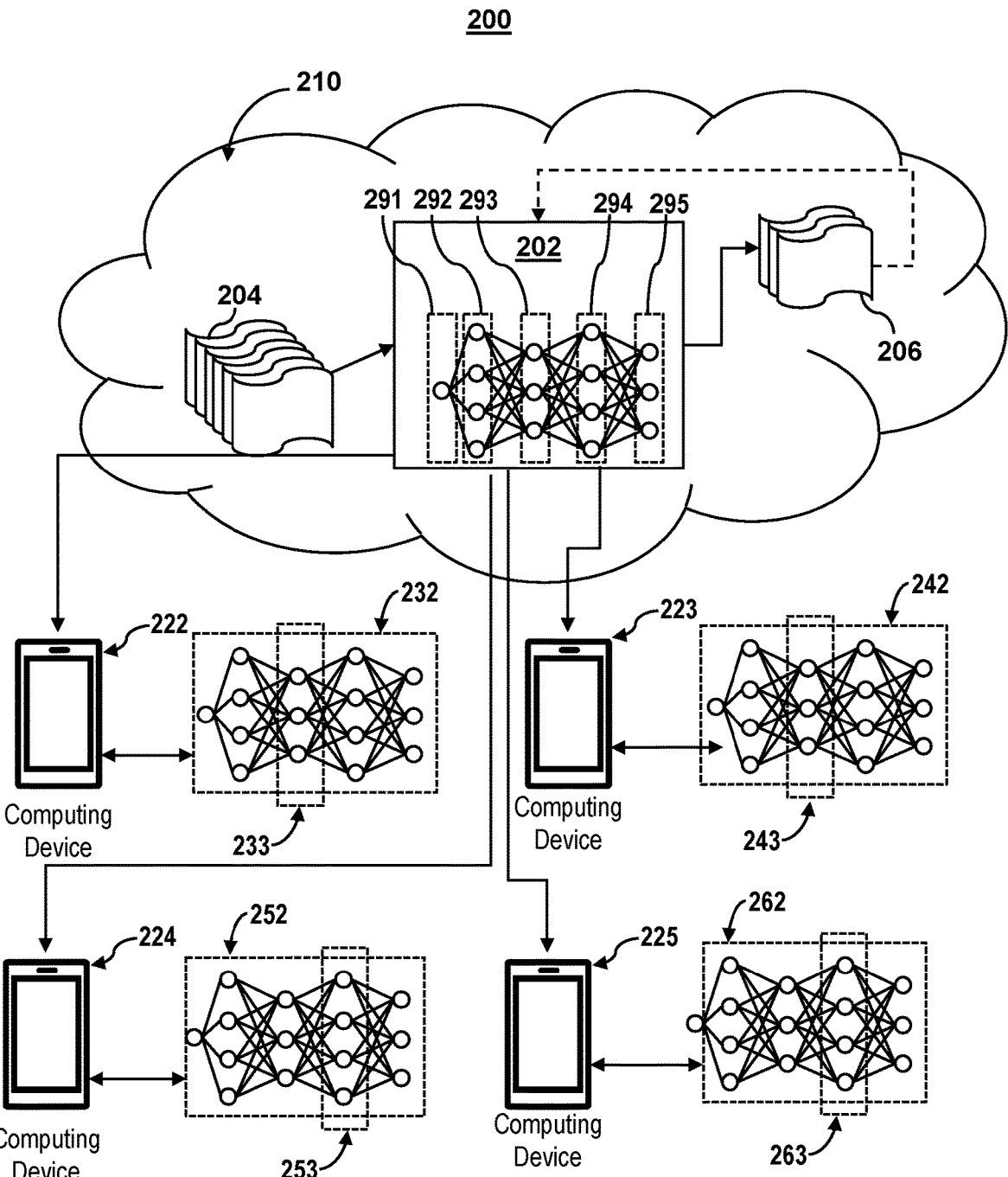
FIG. 2 shows an illustrative diagram of a system for implementing a federated learning model with a model-limited communication system, in accordance with one or more embodiments.

FIG. 2 shows an illustrative diagram of a system for implementing a federated learning model with a model-limited communication system, in accordance with one or more embodiments. A system 200 may include a plurality of computing devices that includes a first computing device 222, a second computing device 223, a third computing device 224, and a fourth computing device 225. Though depicted as mobile computing devices, each of the computing devices 221-224 may be any computing device, including, but not limited to, a smartphone, a laptop computer, etc. FIG. 2 also includes cloud system 210 implemented on a distributed computer system, where the cloud system 210 may include any computing device described in this disclosure or any other type of mobile computing device, fixed computing device, or another computing device. In some embodiments, the distributed computer system may include a set of computing nodes, such as a set of servers or remote computing devices operated by a third party. The cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the first client computing device 102, the second client computing device 103, the server 120, the network 150, or the set of databases 130. The set of databases 130 may each be controlled by different computing nodes of the set of computing nodes, and a query received by the set of databases 130 may cause each node of the set of computing nodes to perform a search based on the query. For example, some embodiments may send a query to the cloud system 210 to retrieve machine learning model parameters, update machine learning model parameters, etc.

In some embodiments, the cloud system 210 may include a machine learning model 202. The machine learning model 202 may take inputs 204 and provide outputs 206. The inputs may include training datasets, testing datasets, validation datasets, or other types of datasets. The machine learning model 202 may include a multi-layer neural network having multiple layers, including a first level layer 291, a second level layer 292, a third level layer 293, a fourth level layer 294, and a fifth level layer 295. In such embodiments, the machine learning model 202 may include an input layer and a set of hidden layers. Each neural unit of the machine learning model 202 may be connected with many other neural units of the machine learning model 202. Such connections can be enforcing or inhibitory in their effect on the activation state of connected neural units. In some embodiments, each individual neural unit may have a summation function that combines the values of all of its inputs.

In some embodiments, each connection (or the neural unit itself) may have a threshold function such that the signal must surpass it before it propagates to other neural units.

As should be understood in this disclosure, a first layer does not necessarily refer to an order of layers, such that referring to the first layer is not necessarily equivalent to referring to the first level layer. For example, a first layer may be any one layer of the set of layers of the machine learning model 202, where the set of layers includes the first level layer 291, the second level layer 292, the third level layer 293, the fourth level layer 294, or the fifth level layer 295. As described elsewhere in this disclosure, different computing devices may provide parameters or changes to parameters (e.g., neural unit weights, biases, activation function parameters, memory values, etc.) corresponding with a subset of the level layers without providing parameters of other level layers.

In some embodiments, machine learning model 202 may update its configurations (e.g., weights, biases, or other parameters) based on the outputs 206 and reference feedback information (e.g., user indication of accuracy, reference vectors, or other information). In some embodiments, connection weights of the machine learning model 202 may be adjusted to reconcile differences between the neural network's prediction and reference feedback. For example, an output layer of the machine learning model 202 may correspond with a category (e.g., a data label), and a field identifier or field descriptor that is known to correspond with that classification may be provided to an input layer of the machine learning model 202 during training.

In some embodiments, machine learning model 202 may include multiple layers (e.g., where a signal path traverses from front layers to back layers). In some embodiments, the machine learning model 202 may use backpropagation techniques, where forward stimulation is used to reset weights on the "front" neural units. For example, one or more neurons (or cells) of the neural network may require that their respective errors be sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the machine learning model 202 may be trained to generate better predictions. In some embodiments, stimulation and inhibition operations for the machine learning model 202 may be structured with skips, may include neural units having additional internal parameters, or may be more free-flowing, with connections interacting in a more chaotic and complex fashion.

Some embodiments may use different types of machine learning models to obtain different types of results. Furthermore, some embodiments may use a machine-learning model that includes different sub-models capable of being used in series, where outputs of one sub-model may be used as inputs of another sub-model. Some embodiments may use a machine learning model to label tokens, detect anomalies, or predict outcomes. For example, some embodiments may predict a future user action as part of the outputs 206 using the machine learning model 202 based on a set of user inputs, where the set of user inputs may include data entered by a user, sensor information provided by a user, etc. The neural network used to determine patterns may include a convolutional neural network, an encoder-decoder neural network, a transformer neural network, a long short-term-memory (LSTM) neural network, an ensemble neural network, or another type of neural network. In some embodiments, outputs 206 may be fed back to the machine learning model 202 as inputs to train the machine learning model 202. For example, the outputs 206 may be used to label input data. An indication that an output does not match a training objective associated with the input data during a training operation may cause some embodiments to retrain the machine learning model 202 and update the associated learning model parameters of the machine learning model 202.

Some embodiments may use a weak supervision method to train a machine learning model to label a token or token sequence. For example, some embodiments may use a boosted random forest model (e.g., a random forest model implemented with XGBoost or another boosting technique) to label a token sequence that includes both primary tokens and context tokens by building an aggregate of weak learners. Alternatively, or in addition, some embodiments may train and use other ensemble learning models based on a weak supervision method. In cases where the document is obtained from a training set, some embodiments may compare the output labels with the training data output labels and update one or more parameters of the machine learning model 202.

In some embodiments, the cloud system 210 may distribute the machine learning model 202 to the computing devices to 222-225. The first computing device 222 may receive a distributed instance 232, the second computing device 223 may receive a distributed instance 242, the third computing device 224 may receive a distributed instance 252, and the fourth computing device 225 may receive a distributed instance 262. In some embodiments, different computing devices may receive different data selection parameters that cause the different computing devices to send different subsets of data. For example, the first and second computing devices 222-223 may receive a first data selection parameter that causes each computing device to send neural network weights for a first layer 233 and a second layer 243, respectively. Similarly, the third and fourth computing devices 224-225 may receive a second data selection parameter that causes each computing device to send a third layer 253 and a fourth layer 263. As indicated by FIG. 2, the first layer 233 and the second layer 243 may both be a third level layer of their respective distributed instances of the machine learning model 202. Similarly, the third layer 253 and the fourth layer 263 may both be a fourth level layer of their respective distributed instances of the machine learning model 202.

Each device of the computing devices 222-225 may perform training operations to update their respective distributed instances. For example, the first computing device 222 may perform training operations to update the distributed instance 232, the second computing device 223 may perform training operations to update the distributed instance 242, the third computing device 224 may perform training operations to update the distributed instance 252, and the fourth computing device 225 may perform training operations to update the distributed instance 262. Each of the training operations for each device may be performed independently, synchronously, asynchronously, etc. Each of the computing devices 222-225 may perform different numbers of training operations, use different data for training, perform training at different times, etc.

A device of the computing devices 222-225 may determine that a set of transmission criteria has been satisfied and, in response, send a portion of the trained machine learning model back to the cloud system 210. For example, the first computing device 222 may determine that a set of transmission criteria has been satisfied and, in response, send neural network weights of the first layer 233 to the cloud system 210. The set of transmission criteria may include one or more criteria. A criterion of the set of transmission criteria may include a criterion that the distributed instance of a computing device has been updated a threshold number of times, where the threshold number may be one, two, three, or another value greater than three. For example, the first computing device 222 may be set with an update threshold equal to one, such that the first computing device 222 will send neural network weights corresponding with the first layer 233 to the cloud system 210 after updating the distributed instance 232. Alternatively, or in addition, the set of transmission criteria may include a criterion related to a network performance metric such as wireless signal strength, bandwidth, latency, etc. For example, the second computing device 223 may be set with a criterion such that the second computing device 223 sends neural network weights corresponding with the second layer 243 to the cloud system 210 based on a determination that a received signal strength indicator (RSSI) of the second computing device 223 is greater than an RSSI threshold.

As described elsewhere in this disclosure, each computing device of the computing devices 222-225 may receive different values for their respective data selection parameters. For example, the first computing device 222 and the second computing device 223 may each receive the data selection parameter "3" to indicate that the third level layer should be sent to the cloud system 210. Similarly, the third computing device 224 and the fourth computing device 225 may each receive the data selection parameter "4" to indicate that the fourth level layer should be sent to the cloud system 210. Each device of the computing devices 222-225 may send, to the cloud system 210, neural network model parameters indicated by the respective data selection parameter received by the respective device after determining that a respective set of transmission criteria has been satisfied.

After receiving different subsets of weights from different devices, the cloud system 210 may combine model parameters from different devices that were sent the same data selection parameter. For example, the cloud system 210 may combine neural network weights of the first layer 233 and the second layer 243 by determining a measure of central tendency for their respective weights. Additionally, the cloud system 210 may combine neural network weights of the third layer 253 and the fourth layer 263 by determining a measure of central tendency for their respective weights. Determining a measure of central tendency may include determining a mean average, a median, a mode, etc. Furthermore, some implementations may account for additional operations to obfuscate transferred data, such as operations to change the order of a set of weights received from a client computing device. For example, before sending a list of values [0.1, 0.3, 0.25] that represent neural network weights corresponding with the first layer 233, some implementations may reorder the weights that are being sent to be [0.3, 0.1, 0.25]. The cloud system 210 may perform operations to reverse this reordering to be [0.1, 0.3, 0.25]. Though FIG. 2 depicts the federated learning model as being deployed on a cloud system, other embodiments may deploy the federated learning model on an on-site server, a collection of servers, a distributed computing network, etc.

Figure 3:
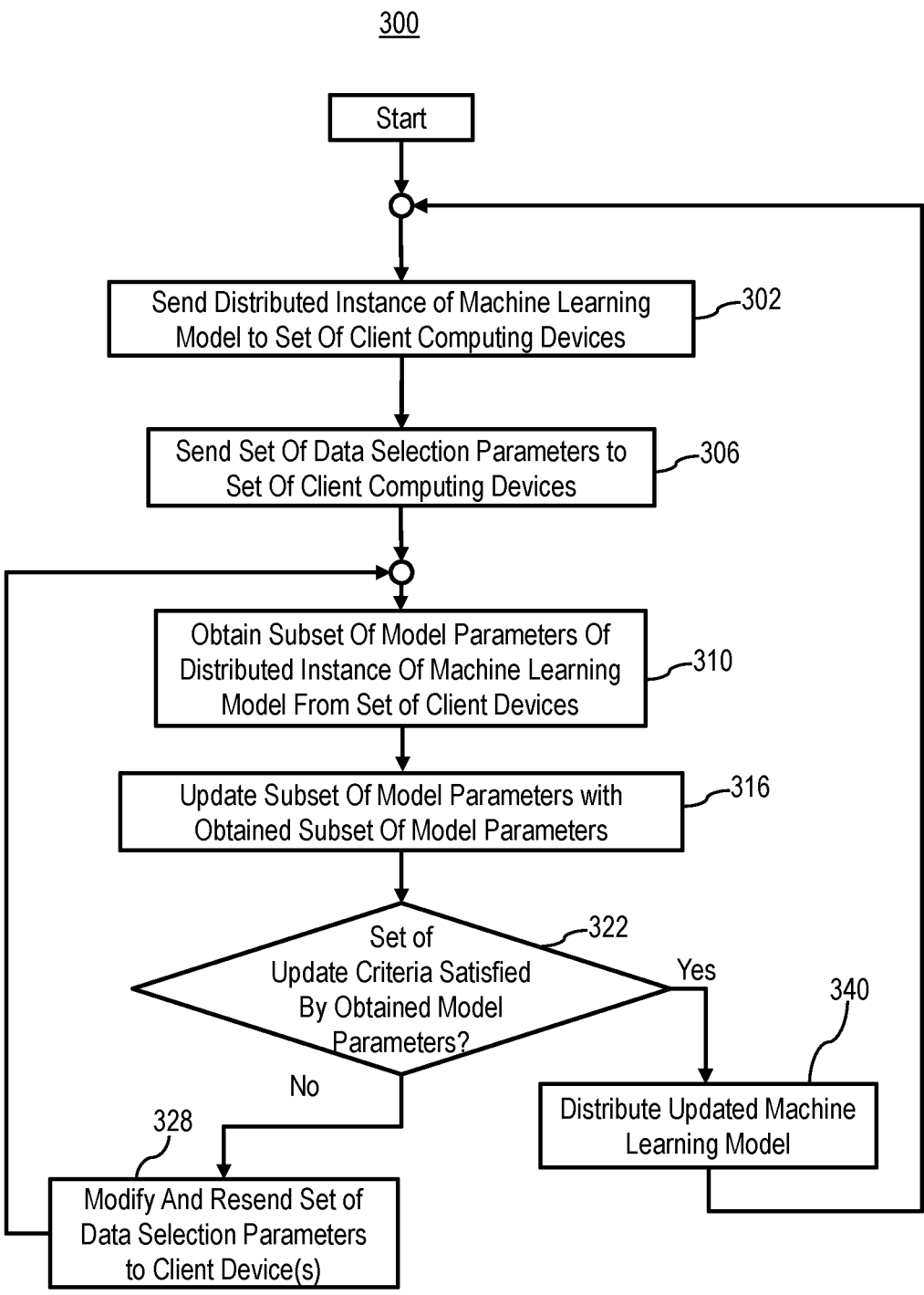
FIG. 3 shows a flowchart of a server-side process to perform federated learning based on a data selection parameter, in accordance with one or more embodiments.

FIG. 3 shows a flowchart of a server-side process to perform federated learning based on a data selection parameter, in accordance with one or more embodiments. Some embodiments may send a distributed instance of a machine learning model to a set of client computing devices, as indicated by block 302. Sending a distributed instance of a machine learning model may include sending parameter values, values indicating the architecture of the neural network model itself, functions, operators, or other data characterizing a machine learning model. Some embodiments may send the distributed instance to a client computing device such that an application executing on the client computing device will generate predictions, labels, or other outputs based on user inputs or other data stored on a client computing device. In some embodiments, the distributed instance may be installed as part of an application. Alternatively, a server or other computing device may provide the distributed instance to a client computing device for use by an application after the application is already installed on the client computing device.

Some embodiments may send a set of data selection parameters to the set of client computing devices, as indicated by block 306. A data selection parameter may indicate a subset of parameter values representing a federated learning model. For example, the data selection parameter may identify a first layer of a neural network model, a subset of trees of a random forest, a subset of node values representing a naïve Bayes model, etc. The data selection parameter may be represented as a set of numbers and strings, where the set of numbers and strings may represent a subset of the layers of a neural network model.

Some embodiments may send a noise-related seed or other noise-related value to a client computing device. As described elsewhere in this disclosure, an application executing on a client computing device may use the noise-related seed or other noise-related value to add noise to values being sent from the client computing device. For example, a client computing device may generate a random value between zero and a noise-related seed to determine a set of noise values. The client computing device may then add the random value to each respective value of the set of values before reporting the noise-modified values. Alternatively, or in addition, some embodiments may provide a restructuring to a client computing device that causes the client computing device to change the order in which neural network layers are reported.

Some embodiments may randomly select the data selection parameter value using a random or pseudorandom operation. For example, some embodiments may determine that a machine learning model consists of five layers and use a pseudorandom method to select two of the five layers. After selecting the two layers, some embodiments may send an identifier (or identifiers) of the selected two layers to a client computing device. Alternatively, some embodiments may use a deterministic method to select which subset of values to transfer from a client computing device to a server. For example, some embodiments may determine that a second layer of a neural network model has received insufficient data and, in response, send a data selection parameter identifying the second layer of the neural network to a plurality of client computing devices. As described elsewhere in this disclosure, the plurality of client computing devices may be instructed to send back parameter values of the second layer of their respective distributed instances of the neural network model.

Some embodiments may obtain a subset of model parameters of a distributed instance of the machine learning model from a client computing device, as indicated by block 310. In some embodiments, the subset of the values characterizing the distributed instances of the neural network model may include a set of layers representing a machine learning model, where the subset of layers does not include all layers of the machine learning model. For example, some embodiments may receive values of a single layer of a neural network model trained by a client computing device. Furthermore, a client computing device may report a second level layer of the neural network to a server or other set of computing devices managing a federated machine learning model. Alternatively, some embodiments may receive values of multiple layers of a neural network model trained by the client computing device.

Some embodiments may change the order of the subset of model parameters obtained from the client computing device. As described elsewhere in this disclosure, a client computing device may change the order in which a sequence of model parameters is sent from the client computing device, where the change in order may be based on a sequence provided by a server, a service, etc. The change in order may provide additional security such that the neural network parameters or other machine learning parameters are scrambled and thus may not be used to reverse-engineer client information by an unauthorized party. Some embodiments may return the sequence of model parameters to a previous state to provide accurate information on the state of a distributed instance of a machine learning model after the distributed instance is updated by a client computing device.

Some embodiments may de-noise a set of values received from a client computing device. As described elsewhere, some embodiments may have previously sent a noise-related seed to a client computing device. The client computing device may then modify values being sent from the client computing device based on the noise-related seed by generating a set of noise-related values based on the noise-related seed and adding the noise-related values to the values being sent from the client computing device. For example, some embodiments may de-noise a set of values representing neural network weights of a neural unit received from different client computing devices by using a rolling average, a convolution filter, a fast Fourier transform filter, etc. Alternatively, or in addition, some embodiments may receive multiple layers that were sorted by a client computing device before reporting the multiple layers based on a restructuring order and, in response, re-sort the multiple layers. For example, if a client computing device was sorted into a first, second, and third layer such that the order of layers was rearranged to be the third, first, and second layers, some embodiments may re-sort the received layers back into the first, second, and third layers.

Some embodiments may update a subset of model parameters based on the obtained subset of model parameters, as indicated by block 316. Some embodiments may combine the subset of model parameters of the distributed instance with subsets of model parameters of other distributed instances provided by other client computing devices. Combining subsets of model parameters may include determining a measure of central tendency, such as by determining a mean average, using values for the subset of model parameters provided by different client computing devices. The values for the subset of model parameters may include parameter values such as neural network weights for a neural network layer, biases for a neural network layer, or changes to the parameter values. For example, some embodiments may receive subsets of model parameters of a first neural network layer as lists of values [0.1, 0.8, 0.45], [0.3, 0.9, 0.55], [0.5, 0.7, 0.95] and determine a mean average of the lists as [0.3, 0.8, 0.65]. Some embodiments may then use the mean average values as combined parameter values for the weights of a federated learning model. For example, some embodiments may set a neural network weight of a first neural unit of a first layer to be equal to 0.3, set a neural network weight of a second neural unit of the first layer to be equal to 0.8, and set a neural network weight of a third neural unit of the first layer to be equal to Alternatively, some embodiments may receive differences in the subsets of model parameters. Some embodiments may then determine a combined parameter value for the differences. As described above, a combined parameter value of different values may be determined as a measure of central tendency of the different values. For example, some embodiments may receive "0.05," "0.07," and "0.06" as differences between the value of a weight for a neural unit before and after training. Some embodiments may then determine the mean average "0.06" as the difference to be applied to the weight of a server-side neural unit weight.

Some embodiments may perform operations to account for the possibility that changes in weights are not compatible with each other. For example, if a first set of client computing devices significantly alters the weights of a first layer of a neural network and a second set of client computing devices does not significantly alter the weights of the first layer, there may be an increased likelihood that weights for a second layer obtained from the first set of client computing devices will not be compatible with the first layer for the second set of client computing devices. Some embodiments may account for this possibility by preventing incompatible sets of weights from being combined. For example, some embodiments may cause a client computing device to determine that updated parameters are compatible with each other. An application executing on a client computing device may perform operations to determine a difference score for an element of a machine learning model (e.g., a neural unit) of a first subset of the machine learning model. The difference score may be equal to the difference between a parameter value for the machine learning model element before a training operation has updated the parameter value and after the training operation has updated the parameter value. For example, if a value of a neural unit of a distributed instance stored on a client computing device is equal to 0.1 before the client computing device performs training operations and is equal to 0.4 after the client computing device performs training operations, the difference score may be equal to 0.3. In some embodiments, a difference score may include an aggregate difference score. For example, a client computing device may generate a difference score for a neural network layer as a mean average of the difference scores for individual neural units of the neural network layer. Some embodiments may then determine whether a difference score of a first subset of machine learning model parameters provided by a client computing device satisfies a difference threshold. In response to a determination that the difference score of the first subset of machine learning model parameters satisfies the difference threshold, some embodiments may permit a server-side machine learning model of the client computing device to be updated by a second subset of machine learning model parameters. Furthermore, the difference threshold may be based on the difference values obtained from other client computing devices.

In some embodiments, a client computing device may generate anonymized data based on user input data, such as user-entered text, user-selected categories, etc. The anonymized data may be anonymized by removing user-identifying information such as numbers, names, addresses, etc. Alternatively, or in addition, some embodiments may relabel categories, change non-relevant selected values, etc. A server or other computing device may then use the anonymized data to test a machine learning model to generate an accuracy score, where the accuracy score may be specific to the computing device supplying the model parameters. For example, after updating model parameters of a machine learning model, some embodiments may determine a device-specific accuracy score by providing the updated machine learning model with anonymized data. In response to a determination that the device-specific accuracy score of a client computing device is below an accuracy threshold, some embodiments may label or otherwise associate the client computing device with a flag indicating that the client computing device provides anomalous data. Some embodiments may then receive values from the client computing device, determine that the client computing device is flagged, and associate values received from the client computing device with flags or labels indicating anomalous data.

In some embodiments, a machine learning model may include an ensemble machine learning model such that different client computing devices may send parameters of different sets of sub-models of the ensemble learning model. For example, some embodiments may receive a first set of parameters for a neural network layer of a neural network of an ensemble learning model and receive a second set of parameters for a random forest of the ensemble learning model. The first set of parameters may be provided by a first set of client computing devices that were caused to train and update distributed instances of the ensemble model. Similarly, the second set of parameters may be provided by a second set of client computing devices that were caused to train and update distributed instances of the ensemble model. Some embodiments may then update different sub-models based on their respective parameters received from client computing devices.

Some embodiments may perform operations to determine whether a set of update criteria is satisfied by the obtained model parameters, as indicated by block 322. When a set of update criteria of a federated learning model is satisfied, some embodiments may determine that a machine learning model is ready for redistribution after being updated. In some embodiments, the set of update criteria may include a criterion that a sufficient amount of data has been received with respect to the number of client computing devices being used to provide data, the number of updates to a portion of a machine learning model, the total amount of data used to update the machine learning model, etc. For example, some embodiments may determine that a set of criteria is satisfied by determining that an accuracy score satisfies an accuracy threshold and, in response, use a machine learning model that was updated based on obtained model parameters to make a prediction, categorize data, etc.

Some embodiments may use criteria based on ratios, where the ratios may indicate that a sufficient number of layers of a neural network or other machine learning model are updated. For example, some embodiments may determine a ratio as a ratio of a first count to a second count. In some embodiments, the first count may be a count of the versions of the first layer of neural network weights received from a first set of client computing devices. For example, the first count may be a count of 200 instances of a first level layer of a neural network that have been received from 200 corresponding different client computing devices. In some embodiments, the second count may be a count of the versions of the second layer of neural network weights received from a second set of client computing devices. For example, the second count may be a count of 50 instances of a second level layer of a neural network that have been received from 50 different client computing devices.

Some embodiments may determine whether the ratio satisfies a ratio threshold, where satisfying the ratio threshold may include determining that the ratio is within a threshold range of one or another number. Alternatively, or in addition, some embodiments may determine that satisfying a ratio threshold may include determining that the ratio is greater than the ratio threshold, less than the ratio threshold, etc. For example, some embodiments may receive 100 sets of machine learning model parameters representing a first level layer of a neural network, receive 200 sets of machine learning model parameters representing a second level layer of a neural network, and determine that the ratio of the first count to the second count is equal to 0.5. Some embodiments may then determine whether the ratio satisfies a ratio threshold of 0.4, where a candidate ratio may satisfy a ratio threshold if the candidate ratio is greater than the ratio threshold. If the set of update criteria is satisfied, operations of the process 300 may proceed to block 340. Otherwise, operations of the process 300 may proceed to block 328.

Some embodiments may modify a set of data selection parameters and resend the modified set of data selection parameters to a set of client computing devices, as indicated by block 328. As described elsewhere in this disclosure, some embodiments may determine that a federated learning model has received an insufficient number of model parameters from distributed instances of client computing devices, after the client computing devices trained their respective distributed instances. In some embodiments, the number of model parameters may be insufficient with respect to an absolute value. Alternatively, the number of model parameters may be insufficient with respect to its relation to another number of model parameters. For example, some embodiments may determine that a count of model parameters for a first level layer of a machine learning model is too few relative to the count of model parameters for a second level layer of the machine learning model. In response, some embodiments may change a data selection parameter to increase the number of the machine learning models. After resending the modified set of data selection parameters to the set of client computing devices, operations of the process 300 may return to operations described by block 310.

Some embodiments may distribute the updated machine learning model to a set of client computing devices, as indicated by block 340. After determining that a set of update criteria is satisfied by the data used to update a machine learning model, some embodiments may flag the updated machine learning model as an updated model ready for redistribution. For example, some embodiments may use the updated machine learning model to generate predictions or other outputs, redistribute model parameters of the updated federated machine learning model, or perform other operations based on the updated federated learning model. For example, after determining that an updated federated learning model satisfies a set of update criteria, some embodiments may redistribute the federated learning model to the set of client computing devices for the client computing devices to predict outputs or to perform additional learning operations. After redistribution of the federated machine learning model stored on a server, a database, or another set of computing devices, a client computing device that received the federated machine learning model may use the updated distributed instances to perform further machine learning operations.

Some embodiments may modify or generate new machine learning models having different hyperparameters or a different architecture based on a determination that a count of updates corresponding with a specific set of parameters is below a threshold. For example, an application on a client computing device may determine whether a numeric change to a parameter or plurality of parameters for a neural network layer exceeds a change threshold. In some embodiments, the client computing device may then report parameters for a neural network layer only if the change to the parameter or plurality of parameters for the neural network layer exceeds the change threshold. For example, a first set of client computing devices may report parameter updates caused by training operations corresponding with a first neural network layer, and a second set of client computing devices may report parameter updates caused by training operations corresponding with a second neural network layer. Some embodiments may count the number of updates corresponding with the first neural network layer and the second neural network layer. If a count of the updates reported by a set of devices corresponding with a neural network layer or a value correlated with the count of the updates satisfies a count threshold (e.g., by being greater than the count threshold, or by being greater than or equal to the count threshold), some embodiments may determine that the neural network layer is sufficiently critical to model accuracy. Alternatively, if a count of the updates reported by a set of devices corresponding with a neural network layer or a value correlated with the count of the updates does not satisfy a count threshold (e.g., by being less than the count threshold, or by being less than or equal to the count threshold), some embodiments may determine that the neural network layer may be removed from an updated machine learning model or a new machine learning model. For example, if a count of the updates reported by the first set of client computing devices corresponding with the first neural network layer is less than a count threshold, some embodiments may generate a new machine learning model that does not include the first neural network layer. Furthermore, it should be understood that some embodiments may modify or remove elements of a machine learning model other than a layer of a machine learning model in response to a determination that a count of updates associated with the removed elements does not satisfy a threshold. For example, some embodiments may modify or remove a set of sub-models of an ensemble model based on a determination that a count of updates associated with the set of sub-models is less than a count threshold.

Figure 4:
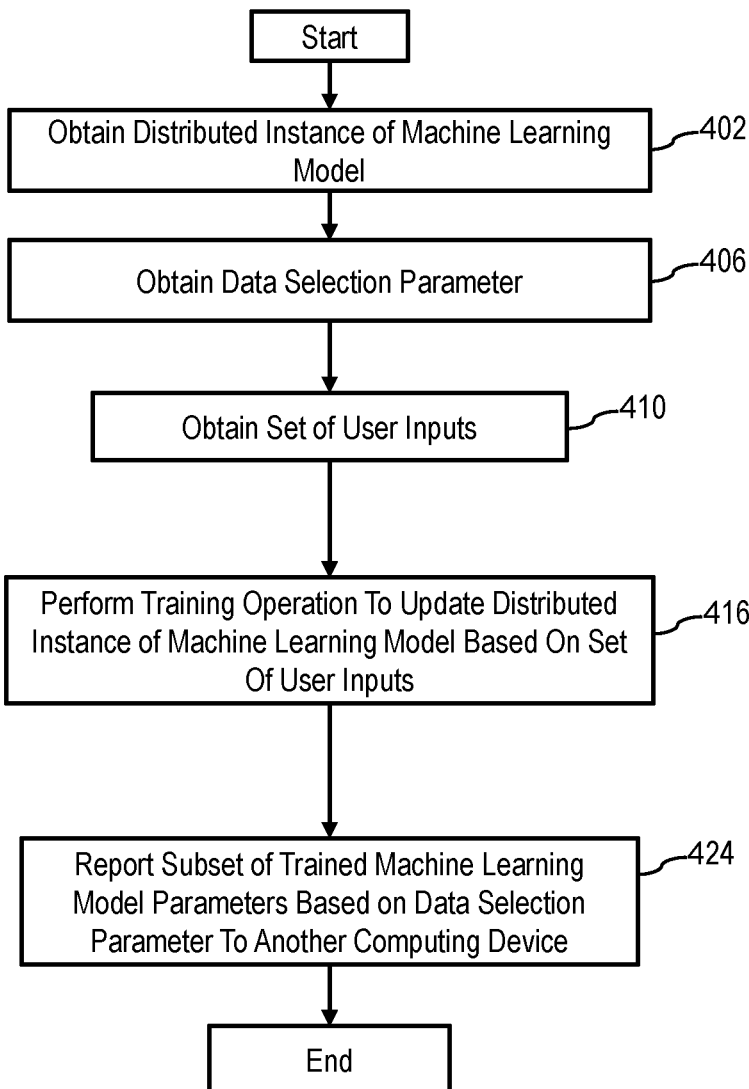
FIG. 4 shows a flowchart of a client-side process to perform federated learning based on a data selection parameter, in accordance with one or more embodiments.

FIG. 4 shows a flowchart of a client-side process to perform federated learning based on a data selection parameter, in accordance with one or more embodiments. Some embodiments may obtain a distributed instance of a machine learning model, as indicated by block 402. Obtaining a distributed instance of the machine learning model may include receiving parameters of a machine learning model. For example, some embodiments may receive, at a client computing device, weights, biases, activation function parameters, other parameters characterizing connections between different neural units, hyperparameters, etc. Furthermore, some embodiments may obtain a distributed instance by sending a request to a server or virtual service for the distributed instance. Alternatively, some embodiments may obtain a distributed instance without sending a request for the distributed instance.

Some embodiments may obtain a data selection parameter, as indicated by block 406. As described elsewhere in this disclosure, a data selection parameter may cause a client computing device to send model parameters identified or otherwise associated with the data selection parameter. Obtaining a data selection parameter may include sending a request for a data selection parameter to a server, a service, or other computing device and receiving the data selection parameter in response to the request. Alternatively, or in addition, some embodiments may receive, at the client computing device, a data selection parameter without first sending a request for the data selection parameter. Furthermore, some embodiments may perform operations to determine the important weights of a pathway of neural units of a neural network and indicate the neural units of the important weights using a set of data selection parameters. Some embodiments may select a pathway that include a neural unit with a weight exceeding a threshold. Some embodiments may select a pathway of a neural network based on an output class of the neural network, where different pathways may be indicated based on different inputs that result in correspondingly different output classes. For example, some embodiments may select a first set of neural units for reporting based on a first input to the neural network and select a set of neural units for reporting based on a second input to the neural unit.

Some embodiments may obtain a set of user inputs, as indicated by block 410. The set of user inputs may include user text entered into a UI, user selections of a category from a drop-down menu, user selections of a Boolean value, etc. In some embodiments, the set of user inputs may include one or more transfer outputs of a user input. For example, the set of user inputs may include text generated from voice inputs. The set of user inputs may also include image data, where image data includes still images, slides of images in a sequence, video data, etc. For example, the set of user inputs may include a video and metadata associated with the video.

Some embodiments may perform a training operation to update the distributed instance of the machine learning model based on the set of user inputs, as indicated by block 416. The training operation may vary based on the type of training to be performed and may vary based on the criteria associated with the training operation. For example, a first client computing device may perform a first training operation based on a determination that a set of training criteria has been satisfied. The set of training criteria may include various criteria, such as a requirement that a threshold amount of user input has been obtained, a threshold amount of text has been obtained, a threshold number of distinct training objectives have been met, etc.

Some embodiments may report a subset of the trained machine learning model parameters based on the data selection parameter to another computing device, as indicated by block 424. As described elsewhere in this disclosure, some embodiments may receive, at a client computing device, a data selection parameter that causes the client computing device to select a specific subset of machine learning model parameters for reporting operations. In some embodiments, the data selection parameter may be a value representing a predetermined subset of model parameters. For example, the data selection parameter may be equal to "1," where the "1" may represent a first level layer of a neural network model. Alternatively, or in addition, the data selection parameter may represent a specific set of sub-models of an ensemble model. For example, the data selection parameter may be equal to "A," where the data selection parameter may cause the client computing device to report a set of machine learning model parameters associated with a random forest machine learning model that is labeled "A."

In some embodiments, a client computing device may add noise to values being reported by the client computing device. For example, the client computing device may receive a noise seed and add noise to a set of model parameters based on the noise seed before sending the noisy data to a server or other computing device. Alternatively, or in addition, a client computing device may sort a sequence of parameters being reported based on a restructuring order previously sent to the client computing device. By changing an initial set of values to be sent into a re-sorted sequence of values, some embodiments may further prevent intercepted data from being used to identify a user or otherwise increase the vulnerability of the user.

In some embodiments, a client computing device may receive a plurality of data selection parameters, where different values may represent different properties of the data being transmitted by a client computing device. For example, the client computing device may receive a plurality of data selection parameters, where a first data selection parameter may represent a third level layer of a distributed instance of a neural network, and where a second data selection parameter of the plurality of parameters may represent a number of consecutive level layers of the distributed instance after the third level layer to report.

In some embodiments, the client computing device may send data selection parameters to another client computing device, where the other client computing device may aggregate learning model parameters of different client computing devices. Some embodiments may determine that a first device has access to data stored on other devices. For example, some embodiments may determine that an account is linked with other accounts, where the other accounts are used to access data via other client computing devices. Some embodiments may send weights or other machine learning model parameters to the first device in response to a determination that the first device already has access to the data stored on the other devices. In some embodiments, the first device may then combine the weights of the different machine learning model parameters sent to the first device before sending the pre-combined value to a server or other computing device used to manage, train, update, or distribute a federated learning model to client computing devices. Furthermore, as described elsewhere in this disclosure, a client computing device may also generate anonymized data based on user input data and send the anonymized data to a server or other computing device. The server or other computing device may then use the anonymized data to test a machine learning model to generate an accuracy score.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. Furthermore, the use of the term "media" may include a single medium or combination of multiple media, such as a first medium and a second medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or in addition, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or LTE network), a cable network, a public switched telephone network, or other types of communication networks or combinations of communication networks. The network 150 may include one or more communication paths, such as Ethernet, a satellite path, a fiber-optic path, a cable path, a path that supports Internet communications (e.g., IPTV), free-space connections (e.g., for broadcast or other wireless signals), WiFi, Bluetooth, near-field communication, or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of the subsystems 124-127 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-127 described herein is for illustrative purposes, and is not intended to be limiting, as any of the subsystems 124-127 may provide more or less functionality than is described. For example, one or more of the subsystems 124-127 may be eliminated, and some or all of a subsystem's functionality may be provided by another one or more of the subsystems 124-127. As another example, additional subsystems may be programmed to perform some or all of the functionality attributed herein to one of the subsystems 124-127.

With respect to the components of computing devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interfaces nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, indicated otherwise, updating an item may include generating the item or modifying an existing item. Thus, updating a record may include generating a record or modifying the value of an already generated value.

Enumerated Embodiments

The present techniques will be better understood with reference to the following enumerated embodiments:

1. A method comprising: sending a data selection parameter to a client computing device, wherein: the client computing device stores a distributed instance of a machine learning model; the machine learning model comprises a first subset of parameters and a second subset of parameters; and in response to a determination that a set of criteria is satisfied, the client computing device is caused to report the first subset of parameters based on the data selection parameter; obtaining the first subset of parameters of the distributed instance from the client computing device; and updating the machine learning model based on the first subset of parameters of the distributed instance from the client computing device.

2. A method comprising: sending a data selection parameter to a client computing device, wherein: the client computing device stores a distributed instance of a multilayer neural network of a machine learning model; and the multilayer neural network comprises a first layer and a second layer; and in response to a determination that a set of transmission criteria is satisfied, the client computing device is caused to report parameters of the first layer without reporting parameters of the second layer based on the data selection parameter; obtaining the parameters of the first layer of the distributed instance from the client computing device; and updating the machine learning model based on the parameters of the first layer of the distributed instance from the client computing device.

3. A method comprising: sending, with a server, a data selection parameter to a client computing device, wherein: the server stores a federated machine learning model; the federated machine learning model comprises a set of neural network weights, wherein the set of neural network weights comprises a first layer of neural network weights and a second layer of neural network weights; the client computing device stores a client-side version of the set of neural network weights; and in response to a determination by an operation of the client computing device that a set of transmission criteria is satisfied, the client computing device is caused to select and send a subset of layers of the set of neural network weights identified by the data selection parameter, wherein the subset of layers comprises the first layer of neural network weights and does not comprise the second layer of neural network weights; receiving, with the server, the subset of layers of the client-side version of the set of neural network weights from the client computing device; and updating the federated machine learning model based on the subset of layers, wherein the second layer of the federated machine learning model is not updated.

4. The method of any of embodiments 1 to 3, wherein: the client computing device obtains a set of user inputs indicating user data entry and user selection; and the client computing device performs a training operation based on the set of user inputs to update the client-side version of the set of neural network weights.

5. The method of any of embodiments 1 to 4, the operations further comprising: determining that a ratio of a first count and a second count satisfies an update threshold, wherein: the first count is a count of the versions of the first layer of neural network weights received from a first set of client computing devices; the second count is a count of the versions of the second layer of neural network weights received from a second set of client computing devices; based on a determination that the ratio satisfies the update threshold, updating the data selection parameter; and sending the data selection parameter to the client computing device after the data selection parameter is updated.

6. The method of any of embodiments 1 to 5, the operations further comprising sending a noise-related seed from the server, wherein receiving the noise-related seed causes the client computing device to: generate a set of noise values based on the subset of layers and the noise-related seed; and update the subset of layers based on the set of noise values.

7. The method of any of embodiments 1 to 6, further comprising sending a restructuring order to the client computing device, wherein: the client computing device is caused to sort parameters of the subset of layers into a re-sorted sequence of values based on the restructuring order; and receiving the subset of layers comprises sorting the re-sorted sequence of values based on the restructuring order.

8. The method of any of embodiments 1 to 7, wherein: obtaining the parameters of the first layer comprises obtaining a plurality of parameters corresponding with the first layer from a plurality of client computing devices comprising the client computing device; and updating the machine learning model comprises: determining a combined parameter value by computing a measure of central tendency based on the plurality of parameters; and updating the first layer of the multilayer neural network based on the combined parameter value.

9. The method of any of embodiments 1 to 8, wherein: the plurality of parameters comprises a subset of parameters, wherein each respective parameter of the subset of parameters is provided by a different client computing device; and the measure of central tendency is a mean average computed from the subset of parameters.

10. The method of any of embodiments 1 to 9, wherein updating the first layer of the multilayer neural network comprises adding the combined parameter value to a stored value of the multilayer neural network.

11. The method of any of embodiments 1 to 10, wherein: the client computing device is a first client computing device; the data selection parameter is a first data selection parameter; the method further comprises: sending a second data selection parameter to a second client computing device, wherein the second client computing device is caused to report parameters of the second layer based on the second data selection parameter; obtaining the parameters of the second layer from the second client computing device; and updating the machine learning model based on the parameters of the second layer.

12. The method of any of embodiments 1 to 11, wherein the machine learning model is a first machine learning model, further comprising: determining a first count, wherein the first count is correlated with a number of times that values corresponding with the first layer are received; determining whether the first count satisfies a count threshold; and based on a determination that the first count does not satisfy the count threshold, generating a second machine learning model, wherein a layer level corresponding with the second layer is not present in the second machine learning model.

13. The method of any of embodiments 1 to 12, wherein the data selection parameter is a first data selection parameter, further comprising sending, to the client computing device, a second data selection parameter different from the first data selection parameter, wherein the second data selection parameter causes the client computing device to report the second subset of parameters.

14. The method of any of embodiments 1 to 13, wherein the data selection parameter is a first data selection parameter, the operations further comprising sending a second data selection parameter to the client computing device, wherein reporting the first subset of parameters comprises selecting a number of layers equal to the second data selection parameter.

15. The method of any of embodiments 1 to 14, wherein: the client computing device is a first client computing device; the data selection parameter is a first data selection parameter; the operations further comprise sending a second data selection parameter to a second client computing device, wherein the second client computing device is caused to report the second subset of parameters based on the second data selection parameter; and the operations further comprise: obtaining the second subset of parameters from the second client computing device; and updating the machine learning model based on the second subset of parameters.

16. The method of any of embodiments 1 to 15, wherein: the client computing device is caused to: perform a training operation that updates the distributed instance of the machine learning model; generate a difference score based on a difference between a value of a parameter of the second subset of parameters before the client computing device performs the training operation and a value of the parameter of the second subset of parameters after the client computing device performs the training operation; and the operations further comprise: obtaining the difference score from the client computing device; determining whether the difference score satisfies a difference threshold, wherein updating the machine learning model comprises updating the machine learning model in response to a determination that the difference score satisfies the difference threshold.

17. The method of any of embodiments 1 to 16, the operations further comprising: obtaining user input data from the client computing device; generating anonymized data based on the user input data; testing the machine learning model based on the anonymized data to obtain an accuracy score; and updating the machine learning model based on the accuracy score.

18. The method of any of embodiments 1 to 17, wherein the client computing device is a first client computing device, wherein the distributed instance is a first distributed instance, and wherein the operations further comprise: obtaining user input data from the first client computing device; generating anonymized data based on the user input data; obtaining a set of parameters of a second distributed instance of a second client computing device; testing a version of the machine learning model using the set of parameters provided by the second client computing device to generate a device-specific accuracy score; and based on a determination that the device-specific accuracy score does not satisfy an accuracy threshold, associate values provided by the second client computing device with a flag indicating anomalous data.

19. The method of any of embodiments 1 to 18, wherein: the machine learning model is an ensemble learning model; and the first subset of parameters comprises parameters for a first set of sub-models of the ensemble learning model.

20. The method of any of embodiments 1 to 19, wherein the client computing device reporting the first subset of parameters by using a random or pseudorandom operation to select the first subset of parameters.

21. One or more tangible, non-transitory, machine-readable media storing instructions that, when executed by a set of processors, effectuate operations comprising those of any of embodiments 1-20.

22. A system comprising: a set of processors; and memory storing computer program instructions that, when executed by the set of processors, cause the set of processors to effectuate operations comprising those of any of embodiments 1-20.

What is claimed is:

1. A system for facilitating distributed learning for a model by selectively indicating which layers of a neural network to send for updating the model, comprising:

one or more processors and one or more memories storing instructions that, when executed by the one or more processors, cause the one or more processors to perform operations comprising:

storing, in a network database, a federated machine learning model comprising a set of neural network weights, the set of neural network weights comprising a first layer of neural network weights and a second layer of neural network weights;

sending, via the Internet, a plurality of data selection parameters respectively to a plurality of client devices, the plurality of data selection parameters comprising (i) a first data selection parameter that corresponds to a first subset of layers and is sent to a first client device and (ii) a second data selection parameter that corresponds to a second subset of layers and is sent to a second client device and not to the first device;

receiving, via the Internet, (i) the first subset of layers of a first client-side version of the set of neural network weights, comprising the first layer of neural network weights and not comprising the second layer of neural network weights, from the first client device based on the first subset of layers corresponding to the first data selection parameter and (ii) the second subset of layers of a second client-side version of the set of neural network weights, comprising the second layer of neural network weights and not comprising the first layer of neural network weights, from the second client device based on the second subset of layers corresponding to the second data selection parameter; and updating, in the network database, the federated machine learning model based on the first subset of layers of the first client-side version of the set of neural network weights and the second subset of layers of the second client-side version of the set of neural network weights.

2. The system of claim 1, wherein the first client device performs a training operation based on a set of user inputs, indicating user data entry and user selection perform at the first client device, to update the first client-side version of the set of neural network weights.

3. The system of claim 1, wherein sending the plurality of data selection parameters to the plurality of client devices comprises sending the plurality of data selection parameters to the plurality of client devices based on an update threshold being satisfied by a ratio derived from (i) a first count of versions of the first layer of neural network weights that are received from a first set of client devices and (ii) a second count of versions of the second layer of neural network weights that are received from a second set of client devices.

4. The system of claim 1, the operations further comprising:

sending a noise-related seed to the first client device in connection with sending the first data selection parameter corresponding to the first subset of layers, wherein the first client device uses the noise-related seed to generate a set of noise values and updates the first subset of layers of the first client-side version based on the set of noise values.

5. The system of claim 1, the operations further comprising:

sending a restructuring order to the first client device in connection with sending the first data selection parameter corresponding to the first subset of layers, wherein, based on the restructuring order sent to the first client device, the first client device sorts parameters of the first subset of layers of the first client-side version into a resorted sequence of values; and after receiving the first subset of layers of the first client-side version from the first client device, sorting the resorted sequence of values of the first subset of layers of the first client-side version, wherein updating the federated machine learning model comprises updating the federated machine learning model based on (i) the sorting of the resorted sequence of values of the first subset of layers of the first client-side version and (ii) the second subset of layers of the second client-side version.

6. A method comprising:

storing, in one or more databases, a machine learning model comprising a set of neural network weights, the set of neural network weights comprising a first subset of weights and a second subset of weights;

sending, via a network, a plurality of data selection parameters respectively to a plurality of client devices, the plurality of data selection parameters comprising (i) a first data selection parameter that identifies the first subset of weights and is sent to a first client device and (ii) a second data selection parameter that identifies a second subset of weights and is sent to a second client device and not to the first client device;

receiving, via a network, (i) the first subset of weights of a first client-side version of the set of neural network weights from the first client device based on the first subset of weights being identified by the first data selection parameter and (ii) the second subset of weights of a second client-side version of the set of neural network weights from the second client device based on the second subset of weights being identified by the second data selection parameter; and updating, in the one or more databases, the machine learning model based on the first subset of weights of the first client-side version of the set of neural network weights and the second subset of weights of the second client-side version of the set of neural network weights.

7. The method of claim 6, wherein sending the plurality of data selection parameters to the plurality of client devices comprises sending, via a network, the first data selection parameter comprising one or more first identifiers corresponding to the first subset of weights to the first client device and (ii) the second data selection parameter comprising one or more second identifiers corresponding to the second subset of weights to the second client device.

8. The method of claim 6, further comprising:

sending a noise-related seed to the first client device, wherein the first client device uses the noise-related seed to generate a set of noise values and updates the first subset of weights of the first client-side version based on the set of noise values.

9. The method of claim 6, further comprising:

sending a restructuring order to the first client device, wherein, based on the restructuring order sent to the first client device, the first client device sorts weights of the first subset of weights of the first client-side version into a resorted sequence of values; and after receiving the first subset of weights of the first client-side version from the first client device, sorting the resorted sequence of values of the first subset of weights of the first client-side version, wherein updating the machine learning model comprises updating the machine learning model based on (i) the sorting of the resorted sequence of values of the first subset of weights of the first client-side version and (ii) the second subset of weights of the second client-side version.

10. The method of claim 6, further comprising:

receiving, via a network, the first subset of weights of other client-side versions of the set of neural network weights from other client devices, wherein updating the machine learning model comprises updating, in the one or more databases, the machine learning model based on (i) a combined parameter value derived from a measure of central tendency computed from the first subset of weights of the first client-side version and the first subset of weights of the other client-side versions and (ii) the second subset of weights of the second client-side version of the set of neural network weights.

11. The method of claim 6, further comprising:

receiving, via a network, the first subset of weights of other client-side versions of the set of neural network weights from other client devices, wherein updating the machine learning model comprises updating, in the one or more databases, the machine learning model based on (i) a combined parameter value derived from one or more mean averages computed from the first subset of weights of the first client-side version and the first subset of weights of the other client-side versions and (ii) the second subset of weights of the second client-side version of the set of neural network weights.

12. One or more non-transitory computer-readable media storing instructions that, when executed by one or more processors, cause operations comprising:

storing, in one or more databases, a machine learning model comprising a set of neural network weights, the set of neural network weights comprising a first subset of weights and a second subset of weights;

sending, via a network, to a first client device, a first data selection parameter that identifies the first subset of weights;

in connection with client-side training of a first client-side version of the set of neural network weights that updates the first subset of weights of the first client-side version and a second subset of weights of the first client-side version, receiving, via a network, from the first client device, based on the first subset of weights being identified by the first data selection parameter, a first subset of parameters corresponding to the first subset of weights of the first client-side version of the set of neural network weights, without receiving the updated second subset of weights that are updated from the client-side training from the first client device; and updating, in the one or more databases, the machine learning model based on the first subset of parameters corresponding to the first subset of weights of the first client-side version of the set of neural network weights.

13. The one or more non-transitory computer-readable media of claim 12, the operations further comprising:

sending a noise-related seed to the first client device, wherein the first client device uses the noise-related seed to generate a set of noise values and updates the first subset of weights of the first client-side version based on the set of noise values.

14. The one or more non-transitory computer-readable media of claim 12, the operations further comprising:

sending a restructuring order to the first client device, wherein, based on the restructuring order sent to the first client device, the first client device sorts parameters of the first subset of parameters into a resorted sequence of values; and after receiving the first subset of weights of the first client-side version from the first client device, sorting the resorted sequence of values, wherein updating the machine learning model comprises updating the machine learning model based on the sorting of the resorted sequence of values.

15. The one or more non-transitory computer-readable media of claim 12, the operations further comprising:

receiving, via a network, other parameter subsets corresponding to the first subset of weights of other client-side versions of the set of neural network weights from other client devices, wherein updating the machine learning model comprises updating, in the one or more databases, the machine learning model based on a combined parameter value derived from a measure of central tendency computed from the first subset of parameters and the other parameter subsets respectively corresponding to the first subset of weights of the first client-side version and the first subset of weights of the other client-side versions.

16. The one or more non-transitory computer-readable media of claim 12, the operations further comprising:

receiving, via a network, the first subset of weights of other client-side versions of the set of neural network weights from other client devices, wherein updating the machine learning model comprises updating, in the one or more databases, the machine learning model based on a combined parameter value derived from one or more mean averages computed from the first subset of weights of the first client-side version and the first subset of weights of the other client-side versions.

17. The one or more non-transitory computer-readable media of claim 12, the operations further comprising:

receiving, via a network, from a second client device, a set of parameters corresponding to a second client-side version of the set of neural network weights; and based on an accuracy threshold not being satisfied by a device-specific accuracy score derived from testing a version of the machine learning model, that incorporates the set of parameters, with an anonymized version of user input data from the first client device, associating parameters provided by the second client device with a flag indicating anomalous data.

18. The one or more non-transitory computer-readable media of claim 12, the operations further comprising:

based on a count threshold not being satisfied by a first count of versions of the first subset of parameters that are received from a first set of client devices, generating a second machine learning model that does not include at least one layer level corresponding to at least one other layers of the machine learning model other than a first layer comprising the first subset of weights.

19. The one or more non-transitory computer-readable media of claim 12, wherein:

the first subset of parameters comprises difference values derived from respective differences between the first subset of weights of the first client-side version before a training update to the first client-side version and the first subset of weights of the first client-side version after the training update to the first client-side version, and updating the machine learning model comprises updating, in the one or more databases, the machine learning model based on the difference values received from the first client device.

\* \* \* \* \*